(12) United States Patent
Ellis

(10) Patent No.: US 8,718,684 B2
(45) Date of Patent: May 6, 2014

(54) TEXT MESSAGE PAGING AND ORDERING SYSTEM

(75) Inventor: Michael Ellis, Glenelg, MD (US)

(73) Assignee: iSpeedbuy, LLC, Glenelg, MD (US)

( * ) Notice: Subject to any disclaimer, the term of this patent is extended or adjusted under 35 U.S.C. 154(b) by 103 days.

(21) Appl. No.: 12/632,666

(22) Filed: Dec. 7, 2009

(65) Prior Publication Data

US 2011/0136516 A1    Jun. 9, 2011

(51) Int. Cl.
*H04W 68/00*    (2009.01)

(52) U.S. Cl.
USPC ..... 455/458; 455/466; 455/414.3; 455/412.2; 705/5; 705/14.1

(58) Field of Classification Search
CPC ............................. H04W 68/00; H04W 68/005
USPC ................. 455/466, 412.2, 414.1–414.3, 458; 705/5, 14.1
See application file for complete search history.

(56) References Cited

U.S. PATENT DOCUMENTS

| | | |
|---|---|---|
| 7,197,478 B2 | 3/2007 | Kargman |
| 7,302,403 B1 | 11/2007 | Landau et al. |
| 2002/0007292 A1* | 1/2002 | Paxton et al. ..................... 705/6 |
| 2008/0147514 A1 | 6/2008 | Shuster et al. |
| 2008/0154654 A1* | 6/2008 | Niessen et al. ................... 705/5 |
| 2008/0261635 A1 | 10/2008 | Samiri et al. |

OTHER PUBLICATIONS

CTIA Basics of CSC FAQs, http://www.ctia.org/business_resources/short_code/index.cfm/AID/10341, May 2008.*

* cited by examiner

*Primary Examiner* — Marcos Torres
(74) *Attorney, Agent, or Firm* — Renner, Kenner, Greive, Bobak, Taylor & Weber (57) ABSTRACT

A text message paging and ordering system utilizes a dedicated or shared short code to enable an establishment, such as a restaurant, to send pages to mobile communication devices, such as a mobile phone. Transmitted text messages sent from the establishment are associated with a short code, which allows the mobile communication device in receipt of the text message to send reply messages back to the establishment associated with the short code. As such, this provides a wireless carrier approved medium that reliably and readily enables an establishment to have two-way text communication with a customer or client to facilitate paging functions as well as ordering functions.

19 Claims, 2 Drawing Sheets

TEXT MESSAGE PAGING AND ORDERING SYSTEM

TECHNICAL FIELD

The present invention relates generally to mobile communication systems. In particular, the present invention relates to a text message paging and ordering system that uses short codes, either dedicated or shared, to address simple message service (SMS) and multimedia message service (MMS) messages to facilitate paging and ordering functions between a customer and an establishment.

BACKGROUND OF THE INVENTION

Due to the advent of portable communication devices, business establishments, such as restaurants, have sought to leverage this technology to achieve higher operating efficiencies, take advantage of strategic marketing opportunities, receive and act upon quantitative consumer data, and provide enhanced customer relations. Moreover, restaurants have also sought to make the ordering process more convenient for customers, so that order fulfillment is more efficient and streamlined.

For example, in many restaurants, once an order is placed or a table has been requested, there is a need for clients or customers to be contacted to notify them that their order has been completed or that their dining table is ready for them. Such notifications are largely accomplished verbally by a hostess or other attendant, requiring the customer to listen very carefully for his or her name to be called thereby. However, other manners for notifying a customer regarding their order or table status utilize wireless electronic pagers, such as "coaster pagers", that are carried by the customers and provide an audible and/or visual paging alert at the command of the establishment.

Coaster pagers generally require that the customer wait in close proximity to the hostess or sales station in order to be within the wireless communication range of the paging system of the establishment. Additionally, while the establishment can alert the customer via the coaster pager, there is no provision for communicating data from the customer's coaster pager back to the establishment. As such, coaster pagers do not provide two-way communication between the establishment and the customer, and thus there is no way for the customer to identify the status of their wait or to allow them to electronically order food via the coaster pager. Moreover, coaster pagers are prone to being stolen, often need replacement, and are costly to initially procure and maintain. Furthermore, while coaster pagers may provide a manner in which printed media can be displayed, such advertising methods tend to be costly, requiring a considerable amount of time in planning, printing, and maintenance. Additionally, coaster pagers cannot provide for a marketing message to be delivered at some predetermined future time directly to a specific customer due to the nature of their design. Moreover, because coaster pagers come into frequent contact with individuals' hands, they must be frequently cleaned to prevent the transmission of bacteria and viruses to successive users. Additionally, because coaster pagers are required to remain within the wireless communication range of the hostess or sales station, the customer is permitted to wait in only one line at a time.

To overcome the drawbacks of traditional paging systems, including that of coaster pagers, two alternative systems that send text messages have been developed, namely simple mail transfer protocol (SMTP), an email interface and mobile phone number based banking systems. SMTP based systems operate to alert a consumer via a text message received on a mobile communication device, such as a mobile phone. However, such systems are problematic and have many drawbacks, including slow speed and inconsistent operation. Specifically, e-mail was not intended as a system to quickly send or exchange text messages, and as a result, most text messages that are sent using e-mail protocols experience latency problems ranging from 1 minute to 2 hours for example. In addition, to use SMTP based email systems to send text messages, it is necessary for a consumer to have a relatively thorough understanding of the operation of his or her mobile phone, and to know the wireless carrier with which he or she has wireless service in order to enable the establishment to send such text messages to their mobile communication device.

In addition, SMTP text message systems that deliver text messages to facilitate commercial transactions are not sanctioned by wireless phone carriers to handle commercial traffic and, thus, are subject to being potentially disabled at any given time. Moreover, SMTP text message systems only enable one-way communication from the mobile communication device, with no ability for the mobile communication device to respond or otherwise communicate reply messages back to a text message received from the establishment. Thus, due to the lack of two-way communication when utilizing SMTP email systems to deliver text messages, there is no opportunity to present advertising and/or marketing information to the customer's mobile communication device, to respond to an inquiry made by a customer, or to communicate order status to the customer upon the customer's request. As a result, opportunities for the restaurant or other establishment to engage the customer with value-added information and content are lost.

In addition to SMTP text message systems, mobile phone number banking systems provide a system whereby one or more dedicated mobile phone numbers are allocated to handle the flow of text message traffic via a computer interface. However, because these mobile phone numbers are configured for peer-to-peer communication, and not for the completion of commercial transactions, the mobile phone banking systems are subject to intense scrutiny and, therefore, are subject to being potentially disabled by the wireless phone carriers. As a result, the customer and establishment are both exposed to uncertainty as to the continued operation of the phone banking system, which prevents such systems from being widely adopted and placed into service. Furthermore, the use of such communication methodologies also results in the lack of standard opt-in and opt-out approvals that the mobile phone carriers require in order to allow an establishment to transmit marketing messages to customers on its text and data networks.

Therefore, due to the drawbacks of SMTP based systems and phone number banking systems to communicate text messages to customers or clients, efforts have been made to utilize dedicated text messaging technology, whereby simple message service (SMS) and multimedia message service (MMS) based text messages are transferred between mobile communication devices, such as mobile phones. Unfortunately, current mobile communication systems that enable an establishment to communicate text messages with potential or existing customers is relatively costly and complex to integrate into the establishment's operating scheme. Furthermore, such text messaging systems are cumbersome and expensive to operate, making it difficult to establish a text message based paging and order fulfillment system.

Therefore, there is a need for a text message paging system that provides an establishment with a system to provide information to a customer. In addition, there is a need for a text message paging and ordering system to allow an establishment to communicate information to a customer and to allow a customer to communicate information to the establishment in a two-way manner. Furthermore, there is a need for a text message paging system that has reduced operating costs. Still yet, there is a need for a consolidated wireless phone carrier approved text message paging system that enables an establishment to communicate with customers using an SMS (short message service) or MMS (multimedia message service) text message with wireless carrier approved, dedicated or shared short codes. Moreover, there is a need for a text message based paging system that utilizes text messages that are not transferred using communication protocols, such as simple mail transfer protocol (SMTP), which are subject to spam and filtering abuses or mobile phone number banking systems which are subject to being disabled by wireless phone carriers. In addition, there is a need for a text message paging system that allows a user to wait in a "virtual" manner in multiple lines of various establishments.

SUMMARY OF THE INVENTION

It is thus an object of one aspect of the present invention to provide a text message paging and ordering system that uses a short code to facilitate paging and ordering features on a mobile communication device.

These and other objects of the present invention, as well as the advantages thereof over existing prior art forms, which will become apparent from the description to follow, are accomplished by the improvements hereinafter described and claimed.

In general, a text message paging system operable on an existing mobile communication network includes a paging system interfaced with the mobile communication network, whereby the paging system associated with a predetermined short code. The system also includes a communication interface in communication with the paging system and associated with the short code, and at least one wireless communication device in communication with the communication network. During operation, the paging system sends at least one outgoing message with the short code to the at least one wireless communication device, whereupon receipt of the outgoing message, the wireless communication device is enabled to send at least one reply message to the communication interface identified by the short code.

In accordance with another aspect of the present invention, a method of communicating includes providing a paging system that is associated with a short code and providing a communication interface in communication with the paging system. Next, the system obtains a mobile phone number of a mobile communication device and associates the mobile communication device with the short code at the paging system. Finally, an outgoing message generated by the paging system is communicated through a communication network to the mobile communication device.

In accordance with yet another aspect of the present invention, a method for communicating includes providing a communication system that is associated with a short code and providing a communication interface in communication with the paging system, and providing a mobile communication device. Next, the method obtains the mobile phone number of a mobile communication device and assigns the mobile phone number with the communication interface. An order message is communicated from the mobile communication system using the short code, such that data associated with the order is provided to the communication interface from the communication system, wherein the data is used to fulfill the order.

A preferred exemplary text message paging and ordering system according to the concepts of the present invention is shown by way of example in the accompanying drawings without attempting to show all of the various forms and modifications in which the invention might be embodied, the invention being measured by the appended claims and not by the details of the specification.

DETAILED DESCRIPTION

Figure 1:
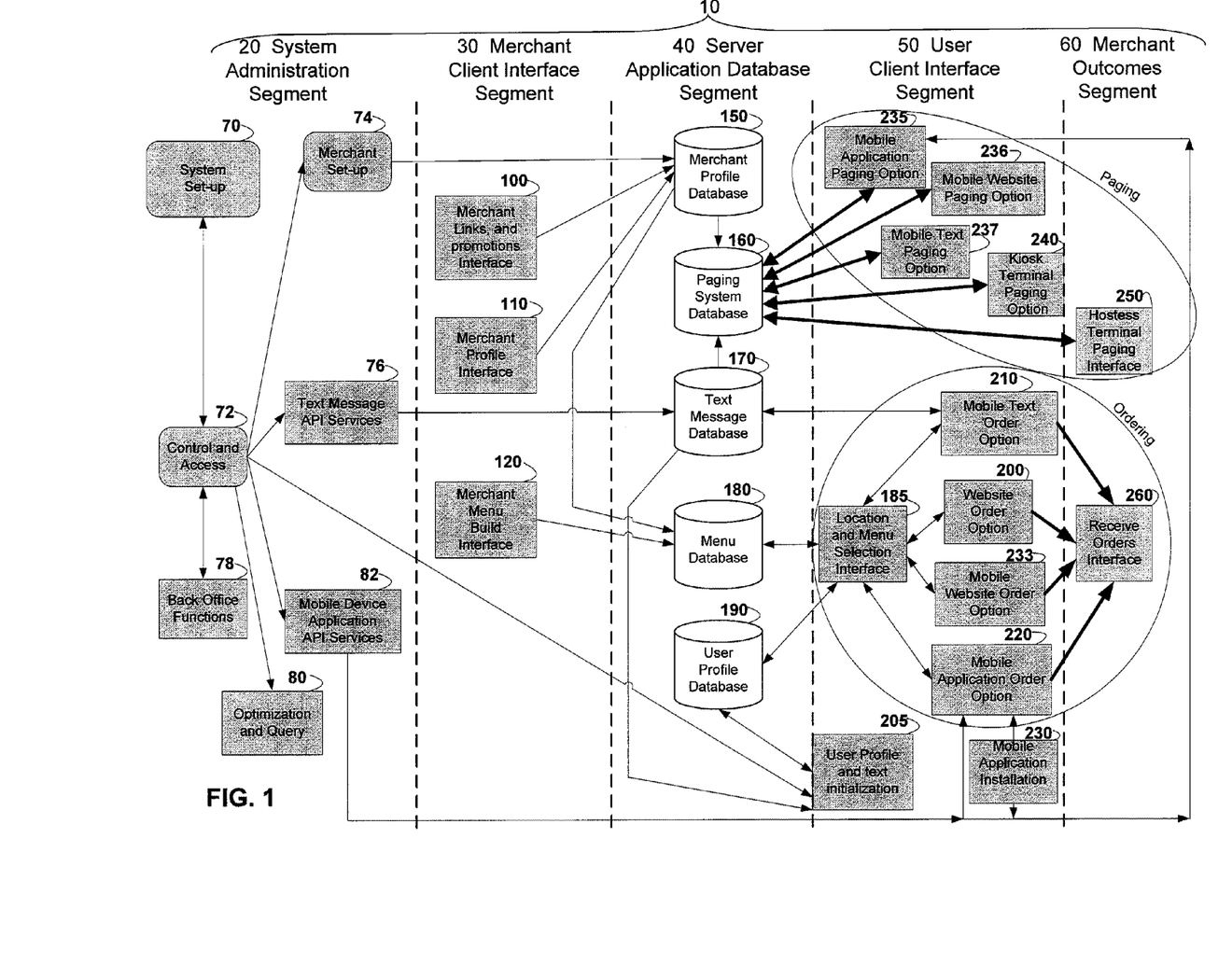
FIG. 1 is a block diagram showing the interrelationship between the operational segments of a text message paging and ordering system in accordance with the concepts of the present invention.

A text message paging system in accordance with the concepts of the present invention is generally referred to by the numeral 10, as shown in FIG. 1 of the drawings. The system 10 allows an establishment, such as a restaurant, to provide paging and/or item ordering services using an SMS (short message service) or MMS (multimedia message service) text message sent to any suitable wireless communication device, such as a mobile phone. The SMS/MMS formatted text message that originates, or is otherwise sent by the establishment, is uniquely associated with a shared or dedicated short code (also known as a short number). The recipient, such as a customer, of the text message can then respond back to the establishment by sending a reply text message to the short code number using their mobile phone or other communication device. The reply message is received by the system 10, where the data contained therein is forwarded to the establishment. Thus, the use of the short code enables the establishment to communicate with customers or users in an interactive manner to facilitate various paging and ordering functions to be discussed using the customer's mobile communication device.

In particular, the short code is an industry-wide, sanctioned standard adhered to by all wireless phone carriers, which allows users of mobile devices to send messages to another device or computer system without needing a mobile number. Messages sent to a short code are routed through to the wireless carriers' SMS/MMS gateway, and thus are not subject to the same abuses, including spam and filtering, that email messages sent to or from mobile devices are. Short codes are issued by the Consolidated Short Code Association (CSCA) to specific establishments under their terms and conditions, which allow users of mobile communication devices to send text messages to another mobile communication device, a computer system or an establishment's phone system, without needing a phone number.

Thus, system 10 utilizes the ubiquity of SMS and MMS text messaging services provided by most current generation mobile communication devices, and does not require the establishment to obtain a unique mobile phone number for each location with which they want users or customers to communicate. Therefore, one short code is sufficient to allow users or customers to communicate with all establishments, although the utilization of additional short codes can be incorporated by the system 10 to scale it to accommodate various levels of text message volume or program differentiation.

That is, program differentiation is the ability of an establishment to separate its programs as it sees fit into different categories, also known as campaigns. For example, an establishment may have an in-store promotion and will put the text message flow on a short code number such as "89765". Additionally, the web site may also have a website promotion and desire to keep the program and text message flow separate, such that the program is assigned to a different short code, such as "98765".

Moreover, short codes are convenient for customers, as they are easy to remember and can be utilized across all wireless carriers for a given application, such that there are two scenarios whereby an establishment can use the short code to transmit short code SMS and MMS text messages. In one embodiment, the short code number can be used by one single establishment that desires to communicate with multiple mobile phone carriers (and thus all the customers who subscribe to those carriers' wireless services) in what is known as a "one-to-many" relationship. In this scenario, the establishment can obtain a short code and then transmit only their ordering and paging messages on that short code. This "one-to-many" relationship is covered in this invention, and benefits include all advantages listed in this invention. Alternatively, it should also be appreciated that the system 10 also may be configured to provide a "many-to-many" relationship, whereby one short code can be used to allow many establishments to communicate with many mobile phone carriers (and thus all the customers who subscribed to those carriers' wireless services). As a result, in a "many-to-many" scenario, there are additional benefits that include further reduction of costs by amortizing fixed costs across multiple establishments, obtaining volume discounts on the text message aggregation, and providing a uniform and consistent message response to all establishments with common set up.

It should be appreciated that the term "establishment" is defined herein to identify any entity that is able to utilize the paging system 10, including but not limited to: restaurants, churches, grocery stores, deli's, service and repair stations, department stores, airports, government agencies, doctor's offices, pharmacies, amusement parks, ball parks, arenas, theaters, and the like, where there is a need to page the customer or user to notify him or her of some action or to offer items or services for sale. Additionally, the term "customer" or "user" is defined herein to describe visitors, consumers, clients, guests, patrons, members, or any other user of the system 10 that desires to communicate with the establishment.

Specifically, the text message paging system 10 is divided into the following functional segments that include: a system administration segment 20, a merchant client interface segment 30, a server application database segment 40, a user client interface segment 50, and a merchant outcomes segment 60. It should be appreciated that the components of the system 10 comprising the segments 20-60 may be embodied in software, hardware, or a combination of both, that are provided as part of a general purpose or application specific computing device or system, such as a computer server.

In particular, the system administration segment 20 facilitates control and access functions that are performed by an administrator of the system 10 or other authorized individual. Specifically, segment 20 comprises a set-up system module 70 that communicates with a control and access module 72. The control and access module 72 communicates with a merchant set-up component 74, a text message API (application programming interface) services component 76; a back office functions component 78, an optimization and query component 80; and a mobile application services API (application programming interface) component 82 to be discussed.

Initially, to place the system 10 into operation, a suitable computing system, such as a computer server with a suitable operating system, is configured via the system set-up module 70, which enables access to the control and access component 72 to allow either the operating logic of the system 10, an administrator or other individual in charge of administrating the system 10 to properly assign, modify, and/or prohibit access rights of individuals, including the merchant and the user or customer, accessing the system 10. For example, those rights may range from a simple-user who inputs information into the system 10 on a need-to-know basis, or other limited basis, to a super-user who has full high-level access to the system 10.

The merchant set-up component 74 is configured to enable the system administrator to initially set up the system 10, so as to assign the log-in credentials of the establishment, comprising a user name and password, and to assign a unique merchant identification code to the establishment. Once the merchant has accessed the system 10, the log-in information is conveyed to the merchant or establishment, and they are then able to proceed to enter data as required in the merchant client interface segment 30. Continuing, the text message application programming interface (API) services component 76 is configured to utilize the appropriate protocol request and response messages needed to properly interface with the commands sent by the wireless network carriers (mobile phone carriers) that are used to communicate transmitted text messages. The handling of these messages is performed through what is commonly known as a gateway, such as an MMS or SMS gateway. These commands contain the protocol necessary to process the text messages containing the short code that the text message paging system 10 is expecting to utilize. In one aspect, the text message API services component 76 may comprise a simple object access protocol (SOAP) based service or representational state transfer (REST) style communication protocol for example, although any other suitable protocol may be used.

The back office functions component 78 enables various administrative functions of the system 10 to be programmed for use by a customer service representative to respond to a customers' or establishments' requests for information, status, and problem resolution. Next, the optimization and query component 80 is a portion of the system 10, whereby system performance can be monitored and adjusted for peak operating effectiveness, including search engine optimization (SEO). The optimization and query component 80 also provides the ability to query various databases of the system 10 for required information, such as routine reporting or one-time, spontaneous reporting requirements. Furthermore, the mobile application services component 82 is specifically provided to enable the administrator of the system 10 to configure and develop web services (or application programming interfaces) to be provided by the system 10 and to push and pull data to a dedicated mobile software application executed by a mobile communication device, such as a mobile phone, when the text messaging functionality is not available.

Next, the merchant client interface segment 30 is configured so that the establishment can use or otherwise interface with the system 10 once proper access is granted thereto by the control and access component 72. Specifically, the merchant client interface segment 30 includes the merchant links and promotions interface 100, merchant profile interface 110 and the merchant menu build interface 120. And as such, the merchant links and promotions interface 100 and merchant profile interface 110 are in communication with the merchant profile database 150, while the merchant menu build interface 120 is in communication with a menu database 180.

The merchant links and promotions interface 100 allows for the storage and maintenance of specific predefined marketing messages, hypertext transfer protocol (HTTP) hyperlinks associated with predefined content produced by the establishment, and promotional advertisements, all of which can be concatenated, attached, appended or otherwise associated with transmitted SMS/MMS text messages that are sent to a user's mobile phone or which may be communicated to a mobile software application for execution on a mobile communication device. Thus, the links and promotions interface 100 allows the establishment to create a highly-customizable SMS/MMS text message that is sent to the customer from the establishment. In one aspect, a user or customer can click on the hyperlinks provided in the SMS/MMS text message to take him or her to additional predefined informational content provided by the establishment that is associated with those hyperlinks. Continuing, the merchant profile interface 110 provides storage and maintenance of information on each specific establishment, such as its location address, phone number, hours of operation, delivery hours, contact information, corporate logos, and payment information.

The merchant menu build interface 120 allows for the storage and maintenance of data regarding items or services for sale, such as food or other items, that are offered for sale or for distribution on its menu in a content management system. The menu build interface component 120 allows the establishment to organize sale items in a hierarchical manner, so that they can be accessed by a customer and recalled or otherwise accessed for use by the customer in the ordering process as necessary, in a manner to be discussed.

Continuing, the server application database segment 40 is comprised of database modules 150-190, which comprises the merchant profile database 150, the paging system database 160, the text message database 170, the menu database 180, and the user profile database 190. Specifically, the merchant profile database module 150 contains the necessary logic and database elements that define various attributes of the establishment, including the establishment's address, phone number, hours of operation, delivery hours, contact information, as well as any other applicable information, including a unique location code generated by the system 10 in the merchant set-up component 74. It should be appreciated that the location code is generated to uniquely identify this merchant and, subsequently, all database attributes associated with this merchant. For example, the location code may comprise "LM0086", which signifies merchant number 86. This location code can be used to lookup a specific merchant in the merchant profile database 150 or allow a user to text message a page or order command to the establishment's location by knowing and referencing that specific location code.

The merchant profile database module 150 is configured so that it is in communication with the paging system database module 160 and the menu database 180. In particular, the paging system database 160 contains the necessary logic and database elements to allow a merchant establishment and customers to interface with the paging system database 160. Specifically, the paging system database 160 contains the name of the customer or user, their unique mobile phone number, time of arrival or desired time of arrival of the customer, the number in the customer's party or group, the estimated wait time, the text message content, timer count down controls that monitor when a text message should be sent, and the priority management functions.

In communication with the paging system database 160 is the text message database 170, which contains the content of various pre-entered or predetermined text messages that can be transmitted to a customer depending on the specific desire of the establishment to send that message to the customer. In addition, the paging system database 160 also includes the necessary logic to construct text messages with information from the merchant profile database 150, the user profile database 190, and a warehouse of mobile phone numbers and their respective status, which includes a listing of all customers and the establishments to which the customer's have opted-in to receive marketing messages and informational content therefrom. The paging system database 160 also includes the complete log of all API (application programming interface) calls made by that number, the specific message flow for that number, and the resulting responses from the wireless gateway provider. It should be appreciated that this is a requirement of the U.S. wireless carriers to maintain and ascertain the history and status of a particular number, including whether the number is active, non-active, or abandoned. Moreover, the paging system database 160 will use the information from the text message database 170 to authenticate the status of the mobile phone number, so that it can be properly used by the paging system 10.

Next, the menu database module 180 contains the logic and database elements that are necessary for the establishment or merchant to construct a menu of items to be sold, so that they are accessible for website or mobile communication device access and ordering. For example, the menu database module 180 may include a database of food items, as well as any other item that the establishment may desire to sell. These items are viewed by the user in the location and menu selection interface 185 via a computer terminal or a mobile software application, which will be discussed in detail below.

It should be appreciated that while the system 10 may be configured for use in facilitating food sales at an establishment, the system 10 can be readily configured to facilitate sales or services of any items, including, but not limited to, tire replacement at a service station, the sale of prescription drugs at a pharmacy, and the sale of flowers or books at a store.

Furthermore, the menu database 180 is configured to be in communication with the merchant profile database 150, so that the appropriate establishment menu information is associated with data in the merchant profile database 150. In addition, the system 10 may be configured to provide location information associated with the establishment to the customer via his or her mobile communication device.

The server application database segment 40, which includes the user profile database module 190, is configured to acquire data from a user profile and text initialization interface 205, while the user profile and text initialization interface 205 communicates with the text message database module 170 and control and access module 72. The user profile and text initialization interface 205 includes an interface, whereby a customer who intends to use the ordering portion of the application interacts with the user profile database 190 to enter or modify all elements of their particular personal information.

In particular, the user profile database module 190 is the portion of the system 10 that contains identifying information about the customers or users who utilize the ordering portion of the system 10, including such information as the customer's billing information, such as credit card number, the customer's address, notification preferences, and other such information necessary to conduct transactions each time the customer uses the system 10. In addition, the user profile database module 190 provides the "opt-in" procedures that a user must go through in order to properly initialize his or her mobile communication device so that they may order and receive promotional information on the paging system 10 from the establishment. That is, mobile phone carriers require mobile communication device users to "opt-in" their mobile phone number to indicate that they agree to receive promotional content via text messages and to verify that the owner of the mobile communication device is actually the person authorizing his or her phone to be used in this manner. In addition to providing the required "opt-in" procedures, the system 10 allows the user of the mobile communication device to "opt-out" of his or her previously opted-in mobile phone number by sending an appropriate command such as "STOP" to the establishment's short code, which is an accepted keyword used by mobile wireless carriers.

With regard to the ordering functions provided by the system 10, the user client interface segment 50 provides four options in which to order items from the establishment. The first option comprises a website order option 200, which provides a website that is accessible from a computer, that is in communication with the location and menu selection interface 185. In particular, the process of ordering via the website option 200 is accomplished by a user locating an establishment of choice through menu selection interface 185, provided by the website, such information may include identifying the particular name of the establishment or restaurant, its location, or food type. As such, the establishment's menu is displayed as a graphical user interface, whereby the user can select food or other items to order via a shopping cart via the website. If the menu items are saved as a favorite selection, then the user can recall the item by either returning to the website for repeated ordering at a later date, or, using his or her mobile communication device to send text-based commands to the short code in order to place the order via his or her mobile communication device.

The second option provided by the system 10 for ordering items comprises a mobile text order option 210, which provides the ability to send predetermined commands associated with the ordering of an item or service to the SMS/MMS short code using the customer's mobile communication device. It should be noted that the mobile text order option 210 accesses the text message database 170 in order to ascertain the opt-in status of the customer's mobile phone number prior to the commencement of the ordering of an item. The opt-in process comprises a procedure whereby the customer has to initialize his or her phone so as to be operable with the short code by replying with a positive response to a command or message sent from the user profile and text initialization component 205. The customer can do this either from a website provided by the establishment or from their mobile communication device on which he or she desires to receive text messages from the short code once a validation message is sent to the customer's mobile communication device. As such, failure to reply positively to the opt-in process will not allow the text message flow to commence. Once determined that the phone number is opted-in for use, items can be ordered using the mobile communication device after the user profile parameters are configured in the user profile database 190 and successfully opted-in by the customer for use on the short code by the user profile and the text initialization component 205.

The third option for ordering items provided by the system 10 is a mobile device application order option 220, which while similar to website order option 200, provides functionality that is specific to a mobile environment, such as the display of enhanced graphics, enhanced text capability, and GPS (global positioning system) capability. The mobile device application ordering option 220, which is a custom applet or software application, can be downloaded from a mobile application installation component 230, such as a website, specifically for operation on the mobile communication device.

The fourth option for ordering items provided by the system 10 comprises a mobile website order option 233, whereby a user accesses a website using a mobile communication device and then enters ordering information or commands in the same manner as those used in the website order option 200 previously discussed.

To enable fulfillment of orders placed using the options described above, a receive orders interface 260 provided by the merchant outcomes segment 60 allows the establishment to receive the notification of an order originating from a customer. That is, the system 10 will route the order data to the receive orders interface 260, such as a computing system and display, that is provided at the establishment, where the order is displayed, printed, or integrated into the establishment's point-of-sale (POS) system for order fulfillment.

In addition to the ordering functionality, the system 10 also provides mobile text message paging functions that utilize the SMS/MMS short codes. In one aspect, the system 10 may be configured such that the user's mobile communication device serves as a mobile kiosk, which provides several paging functions, including: a mobile application paging option 235, a mobile website paging option 236, a mobile text paging option 237, and a kiosk terminal paging option 240. In all cases, the programming and logic of the options provide the same functionality, while allowing the interface to the paging features to be accessed and interacted with in different manners.

In particular, the mobile application paging option 235 communicates with the mobile device application API services component 82. Moreover, the mobile application utilized by the mobile application paging option 235 may be installed on a customer's or user's mobile communication device using mobile application installation component 230, which then enables the user to have a customized interface designed for ease of use when using the mobile communication device or mobile phone. Furthermore, the mobile application paging option 235 allows the customer to interact with the paging system interface 160 without specific training or guidance, thus allowing the customer to use the familiar features of the mobile communication device, as well as enhanced graphics, including help features and customizable colors, text size, and user-defined fields.

The second paging option comprises the mobile website paging option 236 that is utilized by accessing a specific website provided by the system 10 via any suitable web browser. For example, the mobile website provided by option 236 provides data entry fields to enter the customer's mobile phone number, name, number in party, desired service time, and other suitable information, which is communicated to the system 10. As a result of the receipt of the customer's mobile phone number, the establishment that is in communication with the system 10 can then send a short code SMS or MMS text message based page to the customer's mobile phone to alert them. As such, this enables the user or customer to send and receive SMS/MMS short code text messages for paging purposes.

The third paging option comprises the mobile text paging option 237, which enables the customer to use the default text messaging features and interfaces normally provided by the customer's mobile communication device to send a short code text message that is formatted in a specific manner to initiate paging functions. For example, the text message used to initiate text message based page alerts may be defined by a format that may include the unique merchant location code, as previously discussed, or the short code provided by the system 10, and the customer's name, party size, and time desired for a table or service.

In addition, the fourth paging option comprises the kiosk terminal paging option 240. The kiosk terminal paging option 240 utilizes a standalone terminal, typically placed near an entrance of an establishment, which hosts a web page or other interface configured to allow the customer to enter his or her mobile phone number, name, and size of the party or group that is to be seated or served and options for service time desired. Once the customer's mobile phone number and name have been entered, the kiosk terminal paging option 240 interfaces with the paging system database module 160 to forward the information thereto, and an initial text message is sent to the customer or user confirming the opt-in status of the customer's mobile phone or other mobile communication device. In one aspect, the kiosk 240 may comprise an interface that comprises a mouse, keyboard, touch screen, or other suitable input/output interface.

In all four of the options 235,236,237,240 presented for carrying out the paging process, the paging system interface 160 will receive the information initially sent from the customer, including the customer's mobile phone number; process it; and then make the information available to the host/hostess at a terminal paging interface 250, such as a computer terminal, that is maintained at the establishment's particular location. Specifically, the terminal paging interface 250 provided by the merchant outcomes segment 60 may comprise a thin client or other suitable interface and provides an input/output system comprising a display, such as a touch screen display, and a keyboard, which allows the hostess to perform various functions, In one aspect, the terminal paging interface 250 may be used to directly enter the name and/or mobile phone number of the customer who is desiring to be alerted by a page, when the establishment is ready for the customer.

Moreover, the customer management functions, such as arrival time maintenance, recall time, estimated seat or service time, ready time, and SMS/MMS message sending, can all be controlled from the terminal paging interface 250. Furthermore, the customer management features of the paging functions provided by the system 10 allows various attributes to be monitored via the terminal paging interface 250 as well, including arrival time, recall time, time duration, estimated seat time, and ready time. If a person entered his or her mobile phone number in kiosk terminal 240, yet the system clock was not working properly in system 10, then the host/hostess can manually enter in the customer's time of arrival into the system 10 via interface 250. Recall time is the time that a text message can be sent, either automatically or manually, to allow the customer proper notification to return to the host/hostess area to be seated when the customer's turn is nearing. This time duration is variable and can be adjusted by the hostess, depending on traffic flow or the desires of the customer. Next, the estimated seat time is the amount of time that the hostess determines as the wait time for customers, and this value depends on many factors, including capacity of the establishment and the particular time of day or week. Additionally, the ready time is the time that the table is actually ready to be seated and is calculated by the system 10, based on a count between the arrival time and the estimated seat time. And, depending on circumstances, the host/hostess can modify the ready time via the interface 250 to suit the particular circumstances and traffic at the establishment. The terminal paging interface 250 will keep track of the priority, as the specific time of each customer is calculated by the system 10, allowing the host/hostess to send a text message to the customer's mobile communication device when their time is drawing near to be called to the host/hostess station according to the relative ranking of all customers in the system 10 at that time.

The host/hostess or other individual responsible for seating and managing the movement of customers into and out of the establishment can interact with the paging system database 160 via the terminal paging interface 250, while the customer receives text messages from the system 10 that include the short code provided by the system 10. That is, because the terminal interface 250 is in communication with the paging system database 160, the terminal interface 250 can be used to send a text message back to the customer when his or her table or order is ready. For example, the host/hostess may send a text message that include the system's 10 short code and included message "your table is ready" or "please return in 5 minutes" to the customer. In addition, the customer can respond in a two-way manner by sending a reply text message to the short code associated with the received message, such as "I need more time" which is presented on the hostess terminal. It should be appreciated that the customer can also interact with the paging features provided by the system 10 without the host/hostess being involved by sending pre-defined text commands to the paging system database 160 using the short code. Such commands are analyzed and responded to in an automated fashion by the system 10 in accordance with predetermined criteria, and then communicated back to the customer's mobile communication device for viewing. For example, such preconfigured commands that can be sent by the customer to the establishment through the system 10 may include the letter "S" for "status", in which the system 10 will respond with wait time and customer's position in line; and "P" for "promotions", in which the system 10 will respond with promotional coupons or various marketing information. Furthermore, a command such as "20" may automatically add 20 minutes to the wait time if that option is chose by the establishment. However, it should be appreciated that other suitable codes may be utilized to initiate various other automated paging functions provided by the system 10.

Moreover, in the case of either a one-to-many short code configuration or a many-to-many configuration, as previously described, a merchant and a customer are able to appropriately send a short code text message back and forth to the correct mobile phone number and the correct establishment, as the mobile phone number of the customer is parsed from the text message flow and associated with and linked to the merchant location identification number. During the setup of an establishment or merchant in the merchant profile 110, a location code generated by the system 10 is uniquely associated with the merchant, and is stored in the merchant profile database 150 and made accessible to the paging system database 160. A customer enters the communication mobile application 235, mobile website paging option 236, or mobile text paging option 237, and sends a text message to the paging system database 160 of the system 10. The system 10 identifies the mobile phone number of the customer from parsing the text message string received, and the location code from the database, and associates that mobile phone number with the location code. As such, all messages that the customer subsequently sends are communicated to the establishment associated with the location or identification code through the system 10. Thus, the ability of using the mobile phone number and database information to uniquely identify the establishment facilitates the various paging and ordering functions provided by the system 10 discussed herein.

Regarding the use of the kiosk terminal paging option 240 and the hostess terminal option 250, it is not necessary to enter a location code because system 10 will associate all input into these devices with the location code that was associated with the log-in credentials of the person activating the software on these devices, previously having been properly set up and associated in merchant set up 74 and control and access 72.

Figure 2:
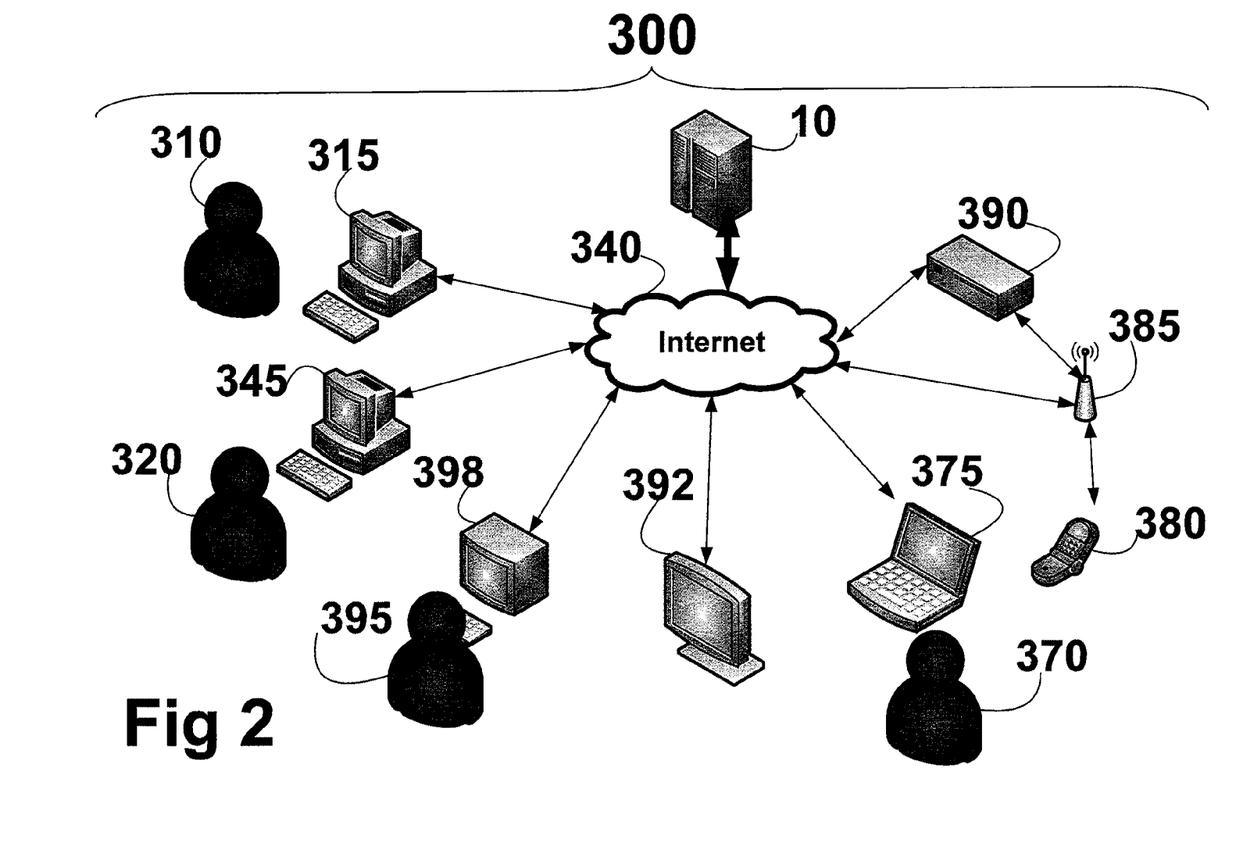
FIG. 2 a flow diagram showing the manner in which an establishment sends SMS/MMS text messages via a common short code to a customer, which, upon receipt by the customer, can be used to send reply messages to the establishment in accordance with the concepts of the present invention.

With the functional segments and associated components of the system 10 having been set forth, the following discussion, with reference to FIG. 2, will present the functions performed by the system 10 when the customers and the establishment utilize the ordering and paging features provided thereby. In particular, both the paging and ordering portions of the system 10 share many database elements, depending on whether the ordering and/or paging functions are in use by a customer. For example, in the event that a customer is using only the mobile text paging option 237, the customer will not populate the user profile database 190 with data via the user profile and text initialization component 205, as that information is not required in order for the customer to use the mobile text paging option 237. Likewise, it is not necessary for the establishment to populate the menu database 180 via the location and menu selection component 185 if only the paging features of system 10 is to be used.

With regard to the website ordering option 200, the mobile text order option 210, the mobile application ordering option 220, and mobile website order option 233, certain preliminary set-up steps common to all four embodiments are carried out. That is, prior to the operation of the system 10, it is initially configured via components 72-82 by an administrator 310 or other authorized individual with access to the system 10 via a suitable computing system 315 that is in communication with the system 10 via the Internet 340.

Once the establishment merchant 320 is connected to the system 10 via a computing system 345 or other suitable interface, the establishment merchant 320 is authenticated by the system 10 using unique sign-on attributes, passwords, or other suitable authentication methods that have been established by the control and access module 72. It should be appreciated that the computing system 345 embodies the receive orders interface 260, discussed with regard to FIG. 1. Next, the establishment merchant 320 overseeing the use of the system 10 at the establishment will populate the database modules 150 and 180 with relevant data associated with the establishment by means of the merchant-client interfaces 100,110,120. Such relevant data associated with the establishment may include, but is not limited to: menu or sale items, location, hours of operation, phone number, marketing messages, and all other information necessary to conduct the proper operation of the system 10, including the names and access rights of the individual associated with this merchant's or establishment's account.

In addition to entering information to populate the databases 150 and 180, the establishment can also use the same computing system to interact with the system 10 on behalf of the establishment and the computing system 345 to access and receive information from the terminal paging interface 250 and the receive orders interface 260. For example, in one aspect, the establishment merchant 320 may enter data on one interface and retrieves data on another. Furthermore, the computing system 345 may comprise a software interface or other graphical user interface, including a website, a standalone personal computer interface, or thin client interface, which provides a series of web pages that are configured to allow data input into a number of custom screens that are suitable for the establishment merchant 320 to enter or retrieve information.

Next, a customer 370 may connect to the system 10 via a computing system 375 provided by the user profile and text initialization component 205, which comprises a communication interface that provides a series of web pages that are designed to allow data to be input or output. Once the identity of the customer 370 is authenticated by the website using unique sign-on attributes, passwords, or via other suitable methods established by the control and access module 72, the customer 370 will populate the database 190 of the server application database segment 40 with data, including data associated with the customer, such as his or her name, address, credit card information, phone number, and the like. It should be appreciated that such an operation may be a one-time operation, whereby such information does not need to be reentered for subsequent transactions.

Continuing, the customer 370 selects the items he or she desires to order by interacting with the website presented on the computer terminal 375 when the website order option 200 is utilized, whereupon an order made via terminal 375 is passed through the Internet 340 and on to the system 10 for processing. Once processed, the system 10 relays the order information through the Internet 340 and to the establishment's computing system 345.

Alternatively, the customer may use his or her mobile communication device 380 to send an order to an establishment through the system 10 via the mobile communication device 380 by a mobile application installed on the mobile communication device 380 as indicated by the mobile application order option 220. As such, the order data that is transmitted from the mobile phone 380 is communicated through the wireless network carrier 385 on to the Internet 340, and to the system 10, where it is processed and then relayed to the establishment's computing system 345 via the Internet 340 for display by the establishment merchant 320.

In yet another embodiment, orders may be placed using text messages sent from a customer's mobile communication device to the establishment, as indicated by the mobile text order option 210. In this embodiment, the ordering feature may be implemented by the system 10, whereby the customer 370 can send a properly formatted SMS/MMS text message on demand to the menu database 180 by way of the location and menu selection interface 185. Such text messages include predefined formats and commands that the system 10 is configured to interpret, which then causes order information to be sent to the specific establishment desired. In particular, the text message is sent from the customer's mobile communication device 380, through the wireless carrier 385, a SMS/MMS gateway 390, and the Internet 340, for receipt by the system 10. Once received, the system 10 combines previously-stored customer information in the user profile database 190 and the other databases 150-180 to create information that is transmitted to the establishment merchant 320 by way of the Internet 340, which includes the information necessary to fulfill the information provided thereby.

For example, the text message ordering function may be configured, such that a customer may previously define and save in the user profile and text initialization component 205 of the system 10 a code name for a menu item, such as a medium cheese pizza at Johnny's Pizza, and identify that combination "FridayPizza". This code name is uniquely associated with that specific customer and specific menu item for a specific establishment in the menu database 180. Subsequently, the customer can access the code name on his or her mobile communication device 380 so as to send a text message that includes "FridayPizza" to the short code number associated with Johnny's Pizza by the system 10 via the mobile communication device 380, and the message will be sent through the wireless carrier 385, the gateway 390, for receipt by system 10, where the information is processed. Next, the system 10 will transmit an order via the Internet 340 to the merchant 320 by way of interface 345. Furthermore, the system 10 may use the information in the text message database 170 to construct a personal text message that is sent back to the customer's mobile communication device 380 by combining his or her name, information regarding the establishment, and the order itself to produce a message, such as "Bill, your order for one cheese pizza at Johnny's Pizza has been received and will be ready for pickup by 10:00 pm". This message will be routed to the customer in the opposite direction in which the order was received by the system 10, whereupon it is routed through the gateway 390, on to the wireless carrier 385, and to the customer's mobile communication device 380 for viewing.

It should be appreciated that the system 10 also allows for the delivery of goods using the same methodology, as discussed above, with the delivery address of the customer either being loaded into user profile database 190, or by using the address, seat location, or common point of interest that is entered into the mobile communication device and communicated to the system 10, as in the case of a text message or mobile software application.

Turning now to the paging features provided by the system 10, it should be appreciated that the system 10 is initially set up via components 72-82 by an administrator 310 or other authorized individual with access to the system 10 via the computing system 315 that is in communication with the system 10.

Once the establishment merchant 320 is connected or otherwise interfaced to the system 10 via the interface 345, the establishment merchant 320 is authenticated by the system 10 using unique sign-on attributes, passwords, or other suitable authentication methods established by the control and access module 72. Next, the establishment merchant 320 overseeing the use of the system 10 at the establishment populates the merchant profile database 150 by means of the merchant-client interfaces 100,110 and loads various information associated with the establishment, including but not limited to: location, hours of operation, phone number, marketing messages, and all other information necessary to conduct the proper operation of the paging portion of system 10. It should be appreciated that this function is generally a one-time function or a process that once populated, is updated only on a periodic basis. In addition to entering information to populate the database 150, the merchant can also use the same interface 345 to interact with the system 10 on behalf of the establishment and to access different components of the application 10, specifically to operate the terminal paging interface 250 and the receive orders interface 260. In one aspect, the interface 345 may comprise a communication interface, such as a web portal provided by a website, a standalone personal computer interface, or thin client interface that provides a series of web pages that are designed to allow data input into a number of custom screens that are suitable for the merchant to enter or retrieve information.

Thus, a customer who is desirous of receiving a page from an establishment, such as a restaurant, would initiate such a request by accessing either the mobile application paging option 235, mobile website paging option 236, or mobile text paging option 237 via the mobile communication device 380 or via the standalone kiosk terminal paging option 240, as indicated by kiosk terminal 392, or by the hostess station 250, accessed by a host or hostess 395 using the establishment terminal 398. That is, the establishment terminal 398 embodies the paging terminal interface 250, discussed with regard to FIG. 2. Specifically, the mobile options 235-237, user kiosk 240, and paging interface 250 via terminal 398 allow the customer or host/hostess to enter the customer's mobile phone number, name, the number in the customer's party or group, and other optional information, such as estimated time of arrival or reservation time.

To illustrate the mobile text paging option 237 a text message is initially created, such as "LM0086, Smith, 4, 10:00 pm" and sent to the system 10 via the short code number provided by the system 10. Next, the text message is transmitted via wireless network 385 through gateway 390 and the Internet 340 for receipt by the system 10, where it is processed and combined with other data from the paging database 160. The system 10 identifies the incoming mobile phone number of the customer of the received text message, and associates it with the location code, and constructs a summary text message that is forwarded by the system 10 to the host/hostess 395 at the establishment terminal 398. Furthermore, the system 10 updates the paging system database 160 and makes the received text message available for review by the establishment merchant 320 on its computing system 345 via the Internet 340. For example, the received text message may read "Smith desires a table for four at 10:00 pm at the Rockville Location". Once a host/hostess sees this information, he or she can send a preprogrammed/predetermined or custom reply or return text message from their computer terminal 345 via the Internet 340 to the system 10, which is then relayed back to the Internet 340 using the message API services 76 of the system 10 and then transferred to the gateway 390 and wireless carrier 385 for delivery to the user's mobile communication device 380.

Once the SMS/MMS text message have been received by the mobile communication device 380 of the customer or user, the short code assigned to, or otherwise associated with, the transmitted text message from the establishment 320 is used to send reply SMS/MMS text messages back to the establishment. As such, the short code eliminates the need for the establishment's phone number in order for customers or users 370 to send a reply message back to the communication interface 345 that is being monitored by the establishment merchant 320.

After the user or customer receives the text message based page from the establishment 320 on his or her mobile communication device 380, the customer 370 may then use the short code associated with the received message to send reply messages for receipt to the establishment 320 via the wireless network carrier 385. For example, the host/hostess 395 may send a customer a text message, such as "please return to the restaurant" to the customer's 370 mobile communication device 380. Upon receiving the message, the customer 370 may "reply" back to the short code associated with the received message with a simple message "30 more minutes", whereby the host/hostess 395 will read the message upon the establishment terminal 398. Correspondingly, the host/hostess 395 will update the paging system database 160 with 30 more minutes, and the customer 370 will be able to see the resulting change in time on his or her cell phone 380 by texting the word "status" to the establishment's short code, assigned by the system 10, to see a resulting increment of 30 minutes on their mobile communication device 380. As the wait time decreases, the host/hostess 395 will again see the time decrease and send another message to the customer 370, such as "your table is ready", when the 30-minute time period expires.

It should be appreciated that the customer 370 can receive the transmitted SMS/MMS text message through various means, including through standard text message interfaces that are provided on the mobile phone or other mobile communication device 380, or alternatively through a mobile application interface or other specialized communication application that is provided by his or her mobile communication device 380. In addition, the establishment merchant 320 can also monitor and control the SMS/MMS text message frequency and content for marketing evaluation purposes. It should be appreciated that the transmitted text messages sent by the establishment 320 may include hypertext transfer protocol (HTTP) hyperlinks that can be accessed by the user 370 via his or her mobile communication device 380. Moreover, the entity that maintains the SMS/MMS gateway 390 uses industry-standard protocols and connectivity to deliver the text message to any wireless or mobile communication device 380 regardless of which wireless or mobile carrier is the provider of service to the particular mobile phone or other mobile communication device 380.

Continuing, the system 10 can also be configured to respond in an automated fashion to the customer 370. For example, instead of a host/hostess 395 having to view the terminal paging interface 250 frequently to identify a change in status, an option is provided in the merchant profile database 150, whereby automated or manual text message responses may be generated by the system 10. Thus, in the event that the automated option is selected, then the text message "your table is ready" would automatically be sent to the customer's mobile communication device 380 once the system 10 calculated the end of the waiting time duration for that customer.

In another aspect, the system 10 may be configured so that a text message with predefined data fields, such as "LM0086, Smith, 4, 10:00 pm", may be sent by the customer 370 to the system 10. The system 10 can interpret this message in an automated manner without the involvement of the host/hostess 395 by analyzing the contents of each field of the text message sent by the customer 370 and updating the paging system database 160. For example, the system 10 may be configured so that the location information "LM0086" of the first data field is compared to location information in the merchant profile database 150 to identify its true location. Continuing, the next data field containing "Smith" is stored in paging system database 160 for informational use in a reply text message; the data field containing the "4" is interpreted as a party of 4 and the system 10 increments the party size field in the paging system database 160 to 4; and the data field including "10:00 pm" is interpreted and used by the system 10 to update the arrival time in the paging system database 160. The system 10 formats the analyzed data and communicates it to the host/hostess 395, who is able to view the data via terminal 398. Additionally, a resulting confirmation text message that the information was received may also be communicated back automatically to the mobile communication device 380 of the customer 370 by way of the Internet 340, the gateway 390, and the wireless carrier 385 for receipt by their mobile communication device 380, as previously discussed. Moreover, it should be appreciated that the computing systems 315,345,375, establishment terminal 398, and kiosk terminal 392 may comprise any suitable communication interface that enables the necessary interaction and communication with the system 10.

It is also contemplated that text message based page alerts initiated by the establishment terminal 398 and communicated to a user or customer 370 by the system can contain a variety of multimedia content including sound clips, video clips, or a combination of both in addition to the text message itself.

It will, therefore, be appreciated that one advantage of the text message paging system is that an establishment can send an SMS/MMS text message based page alerts to a customer, either in a manual or automated fashion, which contains a short code that is used to conveniently send reply text messages back to the establishment. Another advantage of the present invention is that the text message paging system allows an establishment to engage in two-way communication or paging with a customer, so as to facilitate marketing and other interactive communication, as well as obtain analytic or statistical data on customer wait times, arrival times and ordering trends. Still another advantage of the present invention is that the text message paging system uses an SMS/MMS gateway to transfer text messages, and therefore does not utilize simple mail transfer protocol (SMTP) to transfer messages, thereby reducing the potential latency and reliability issues that are inherent in sending text messages using the SMTP protocol. Still another advantage of one or more embodiments of the text message paging system is that a single SMS/MMS short code is utilized, which is sanctioned by mobile phone carriers and provides appropriate opt-in and opt-out procedures, thus ensuring continuity of paging service. Yet another advantage of the system is that no specialized equipment is required to be maintained at the establishment other than the typical computer interface hardware, eliminating the need for specific expertise and maintenance of coaster paging systems and their associated service contract to maintain such equipment. Another advantage of the system is that customers are allowed greater areas to roam, or move about, rather than being required to remain in close proximity to the establishment to wait for a paging alert or notice from the establishment. Additionally, another advantage of the system is to provide the ability to opt-in customers to receive promotions and coupons that may be of interest to them, either at the time of service, or pre-scheduled to arrive at a future date that is more appropriate, such as a coupon for pizza during a sporting event, or other event for example. Still another advantage is a customer can get real-time status updates on where he or she is in the wait process. Still another advantage of the system is the ability for customers to enter into multiple virtual wait lines at the same time. In addition, the customer may take advantage of ordering and paging features at the same time and at different locations at the same time. Still another advantage of the system is that the system can provide paging services to customers for multiple establishments. Still yet another advantage is the use of a person's own mobile device and therefore more hygienic preventing the spread of germs.

What is claimed is:

1. A text message paging and ordering system operable on an existing mobile communication network that utilizes a short code number issued by the Consolidated Short Code Association (CSCA) for the communication of text messages, the system comprising:

a paging and ordering system adapted to be interfaced with the mobile communication network, the paging and ordering system utilizing a single predetermined short code number, which is issued by the Consolidated Short Code Association (CSCA), said paging and ordering system configured to acquire customer wait, appointment, or ordering status information associated with a plurality of establishments;

a communication interface associated with each one of a plurality of establishments, each said communication interface in communication with the mobile communication network and said paging and ordering system, said communication interface configured to obtain and transmit customer wait, appointment, or ordering status information from the paging and ordering system, wherein the single predetermined short code number is associated with each communication interface; and a plurality of wireless communication devices adapted to be in communication with the communication network using a plurality of wireless communication carriers;

wherein, each one of the plurality of communication interfaces is configured to send through the paging and ordering system a plurality of outgoing text messages to each of the plurality of wireless communication devices, each outgoing text message associated with the single predetermined short code number and includes the customer wait, appointment, or ordering status information associated with the establishment, whereupon receipt of the outgoing text message, each of the plurality of wireless communication devices are enabled to send at least one reply text message identified by the single predetermined short code number for receipt by the paging and ordering system, whereupon the paging and ordering system forwards the at least one reply text message to the communication interface associated with the establishment that sent the outgoing text message.

2. The text message paging and ordering system of claim 1, wherein the communication interface comprises a communication portal.

3. The text message paging and ordering system of claim 1, wherein the communication interface comprises a website.

4. The text message paging and ordering system of claim 1, wherein the communication interface comprises a software application.

5. The text message paging and ordering system of claim 1, wherein the outgoing message includes a hyperlink associated with predetermined content.

6. The text message paging and ordering system of claim 1, wherein the outgoing message is associated with a phone number assigned to the wireless communication device.

7. The text message paging and ordering system of claim 1, wherein the outgoing text message comprises a short message service (SMS) or multimedia message service (MMS) message.

8. The text message paging and ordering system of claim 1, wherein the paging and ordering system analyzes and responds to predefined text commands contained in a text message sent by one or more of the wireless communication devices in an automated manner, the paging and ordering system then communicating an appropriate response back to the wireless communication device that sent the text message.

9. A method of communicating customer wait, appointment, or ordering status information from a plurality of establishments comprising:

providing a paging and ordering system that utilizes a single predetermined short code number, which is issued by the Consolidated Short Code Association (CSCA) for the transmission of text messages;

providing a communication interface for each one of the plurality of establishments, each communication interface in communication with the paging and ordering system, such that each communication interface obtains customer wait, appointment or ordering status information from the paging and ordering system;

obtaining a mobile phone number of a plurality of wireless communication devices at each communication interface;

associating the mobile phone number of each of the plurality of wireless communication devices with the short code number at the paging and ordering system;

acquiring customer wait or appointment status information associated with the plurality of establishments at the paging and ordering system;

generating a plurality of outgoing text messages by the paging and ordering system that are each associated with the single short code number; and communicating the outgoing text message that includes the customer wait, appointment, or ordering status information through a communication network to each of the plurality of wireless communication devices.

10. The method of claim 9 further comprising:

communicating a reply text message that is associated with the outgoing text message from the wireless communication device to the paging and ordering system associated with the short code number through the communication interface associated with the short code number.

11. The method of claim 9, further comprising:

including a hyperlink in the outgoing text message.

12. The method of claim 11, further comprising:

selecting the hyperlink on the wireless communication device to present content associated with the hyperlink.

13. The method of claim 9, wherein the outgoing text message comprises a short message service (SMS) or a multimedia message service (MMS) message.

14. The method of claim 9, wherein the reply text message comprises a short message service (SMS) or a multimedia message service (MMS) message.

15. The method of claim 9, wherein at the acquiring step, the paging and ordering system is configured to acquire a plurality of wait or appointment status information that is associated with one or more establishments.

16. The method of claim 9, further comprising:

comparing wait or appointment status information of multiple establishments at the paging and ordering system; and communicating the outcome of the comparison through the communication network to the wireless communication device.

17. The method of claim 10, further comprising:

analyzing the reply text message by the paging and ordering system;

adjusting the wait or appointment status information based on the reply message content by the paging and ordering system; and communicating the adjusted wait or appointment status information to the customer through the paging and ordering system to the wireless communication device.

18. A text message paging system operable on an existing mobile communication network, the system comprising:

a paging system, adapted to be interfaced with the mobile communication network, the paging system associated with a predetermined short code and configured to acquire customer wait or appointment status information associated with an establishment;

a communication interface in communication with the paging system and associated with the short code; and at least one wireless communication device in communication with the communication network;

wherein, the paging system sends at least one outgoing message, which includes the short code and the customer wait or appointment status information associated with the establishment, to the at least one wireless communication device, whereupon receipt of the outgoing message, the wireless communication device is enabled to send at least one reply message to the communication interface identified by the short code for receipt by the paging system, wherein the paging system includes a backup mobile application service component configured to provide an application programming interface to enable the push and pull of data to a dedicated application executed by the at least one wireless communication device when the paging system is unable to send the at least one outgoing message.

19. A method of communicating customer wait or appointment status information comprising:

provinding a paging system that is associated with a short code;

providing a communication interface in communication with the paging system;

obtaining a mobile phone number of a mobile communication device;

associating the mobile phone number of the mobile communication device with the short code at the paging system;

acquiring customer wait or appointment status information associated with an establishment at the paging system;

generating an outgoing message by the paging system that is identified by the mobile phone number; and communicating the outgoing message that includes the customer wait or appointment status information through a communication network to the mobile communication device associated with the mobile phone number, wherein said paging system includes a backup mobile application service component that is configured to provide an application programming interface to enable the push and pull of data to a dedicated application executed by the mobile communication device when the paging system is unable to communicate the outgoing message.

* * * * *